United States Patent Office 2,957,342
Patented Oct. 25, 1960

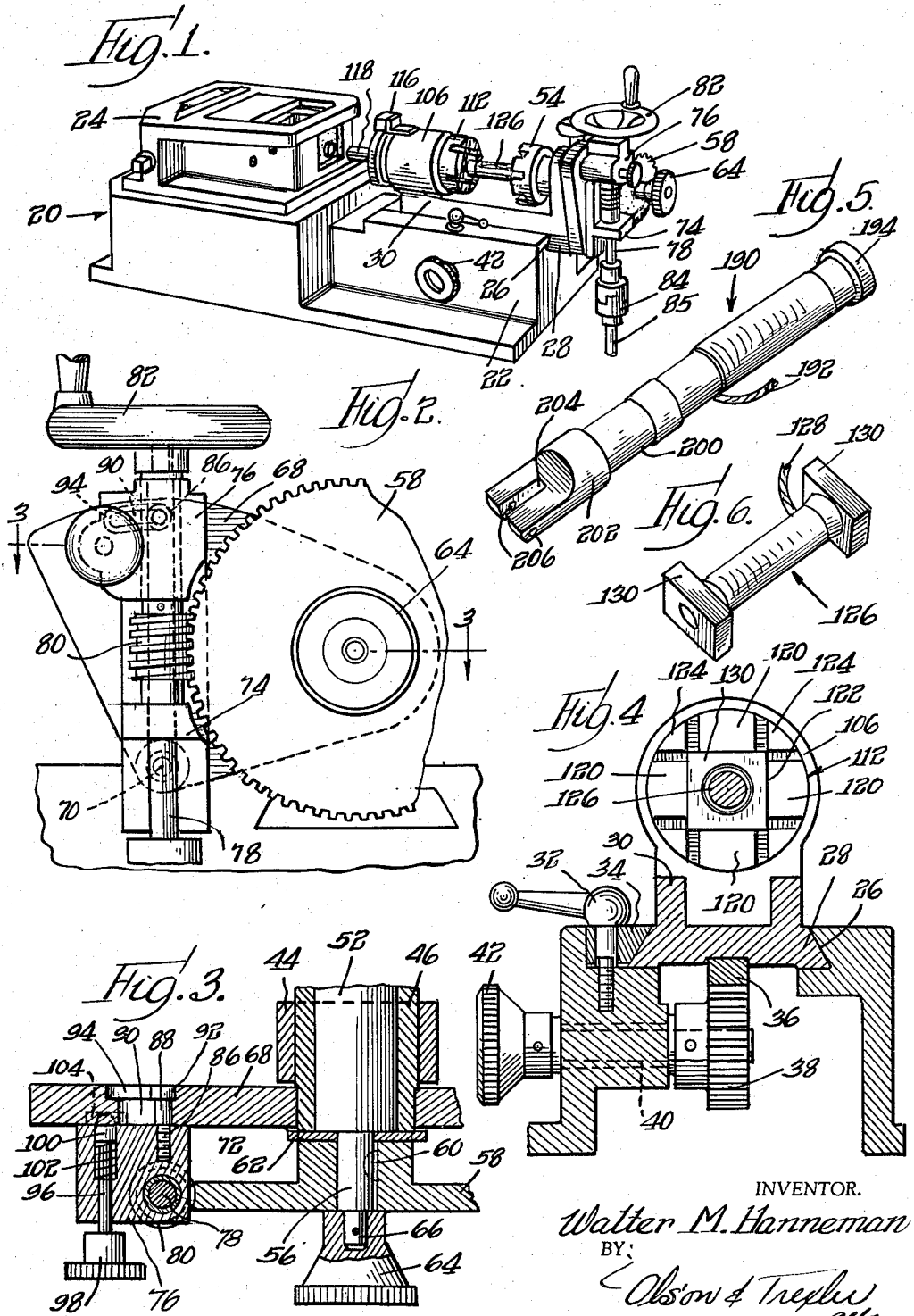

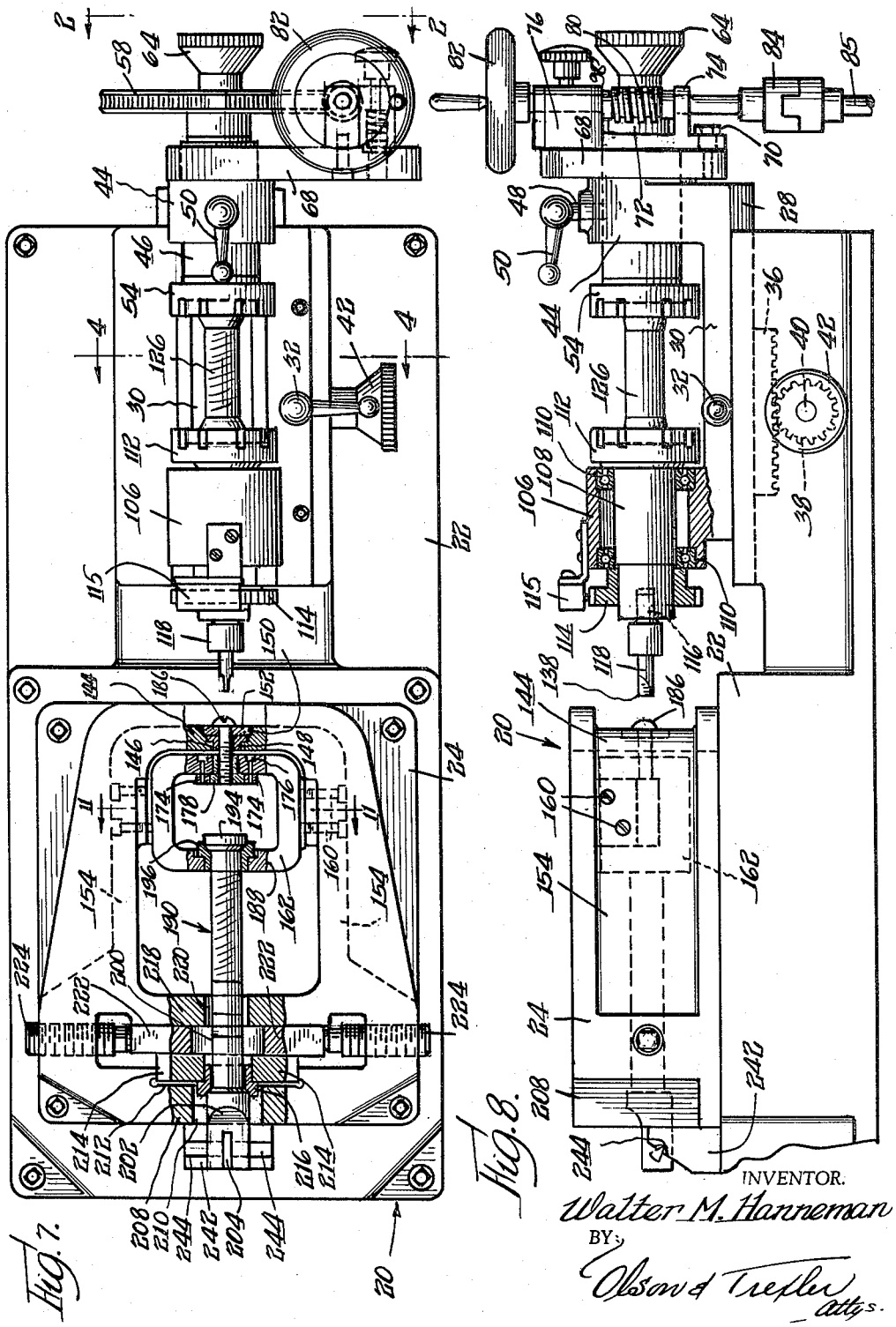

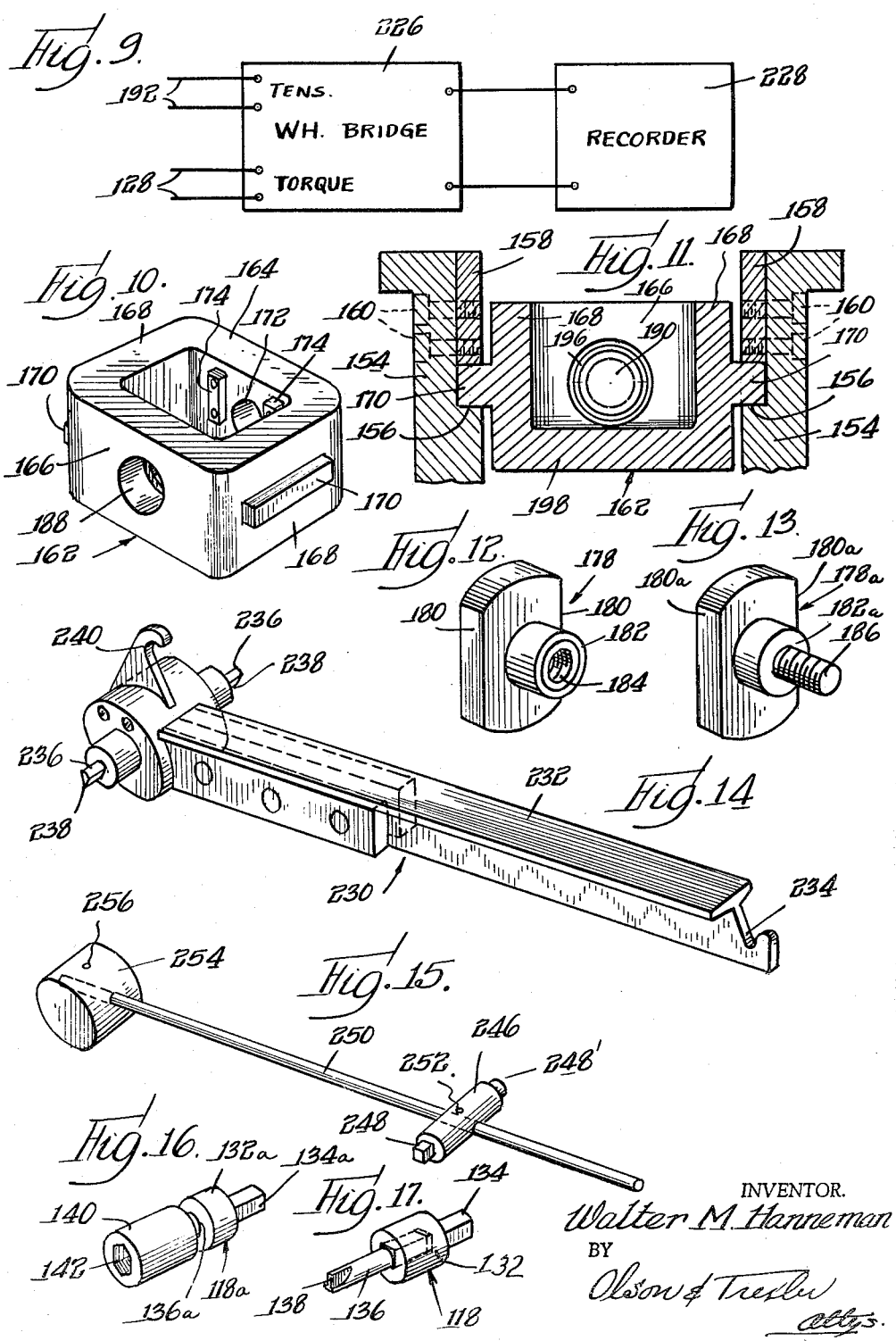

2,957,342

MACHINE FOR MEASURING TORQUE AND TENSION

Walter M. Hanneman, Wheaton, Ill., assignor to Illinois Tool Works, Chicago, Ill., a corporation of Illinois Filed Oct. 3, 1957, Ser. No. 688,056

7 Claims. (Cl. 73—133)

This invention is concerned with a testing machine. When two members or workpieces are held together by fasteners such as rivets or screws, it is tension that holds them tightly together. In the case of rivets, shrinking upon cooling of the heated rivet holds the rivet under tension, and the work parts are thereby tightly held together. In the case of screws and other threaded fasteners, the screw and a nut must be rotatably associated to a sufficient degree to place the screw under tension in order for the work parts to be held tightly together. Measuring of the tension in an installed screw, for example, has heretofore been practically impossible. The torque applied to a threaded fastener is easily measured with a torque wrench. However, the relation between torque and tension is not constant by any means. It varies in accordance with the type of materials used, in accordance with lock washers, if any, and in accordance with many other variables. Accordingly, it is an object of this invention to provide a machine for simultaneously testing torque and tension in rotary threaded fasteners.

It is another object of this invention to provide a machine for measuring tension and torque in threaded fasteners, which machine incorporates strain gauges or load cells, and is provided with means for calibrating such strain gauges or load cells.

It is another object of this invention to provide a machine adapted to test the holding power of threaded fasteners, such as nuts and bolts.

Other and further objects and advantages of the present invention will be apparent from the following description when taken in connection with the accompanying drawings wherein:

Fig. 1 is a perspective view of a machine constructed in accordance with the principles of this invention;

Fig. 2 is an end view thereof as taken from the right end;

Fig. 3 is a horizontal sectional view as taken along the line 3—3 in Fig. 2;

Fig. 4 is a vertical sectional view as taken along the line 4—4 in Fig. 7;

Fig. 5 is a perspective view of the tension measuring load cell or strain gauge;

Fig. 6 is a perspective view of the strain gauge or load cell for measuring torque;

Fig. 7 is a top view of the machine;

Fig. 8 is a side view thereof with certain parts being broken away or shown in section for clarity of illustration;

Fig. 9 is a block diagram illustrating further parts of the testing setup;

Fig. 10 is a perspective view of the yoke for holding the tension cell and the threaded member cooperable with the member under test;

Fig. 11 is a vertical sectional view taken along the line 11—11 in Fig. 7;

Fig. 12 is a perspective view of the hardened nut used for testing a screw;

Fig. 13 is a perspective view of the corresponding hardened stud for testing a nut;

Fig. 14 is a view of the lever used for calibrating the tension strain gauge;

Fig. 15 is a perspective view of the lever used for calibrating the torque strain gauge;

Fig. 16 is a perspective view of the nut driver forming a part of the machine, and;

Fig. 17 is a perspective view of the corresponding screw driver.

Referring now in greater particularity to the drawings, and first to Figs. 1–4, 7 and 8, there will be seen a testing machine designated generally by the numeral 20 and including a base 22 having an upstanding frame portion 24 on the left end thereof, as viewed in the drawings. The base is provided along the top right portion with a dovetailed guide 26 slidably receiving a dovetail 28 on a slide 30. A clamping handle 32 and a gib 34 are provided for frictionally locking the slide in adjusted position.

The slide 30 is provided with a depending rack 36, and a pinion 38 meshes with the rack. The pinion is fixed on a shaft 40 journalled in a suitable bearing in the side of the base 22, and a hand wheel or knob 42 is provided on the outer end of the shaft for rotating the shaft 40 and pinion 38, whereby to shift the slide longitudinally of the base. The knob 42 preferably is knurled as may be seen in the drawings.

The slide 30 is provided with an upstanding flange 44. A sleeve 46 passes through this flange and is held in adjustably fixed position by a stud 48 having a handle 50 thereon. A shaft 52 is journalled in the sleeve 46, and is provided at the left end with a fixture 54 for holding the torque testing load cell or strain gauge, as will be brought out more fully hereinafter. At the opposite end, the shaft 52 is provided with a reduced section 56 having a worm gear 58 mounted thereon. The gear is keyed to the reduced shaft section at 60, and is spaced from the sleeve 46 by a washer 62. An adjusting knob 64, preferably having a knurled periphery, is pinned to the further reduced tip 66 of the shaft 52, to hold the gear 58 in place.

A plate 68 is fixed on the extending end of the sleeve 46, and is held in laterally extending position thereby. The plate is provided at its lower corner with a stud 70 pivotally mounting an upstanding bracket 72. The bracket is provided with a shelf 74 relatively adjacent its lower edge, and with a projection 76 relatively adjacent the top edge. A shaft 78 is journalled in the shelf and projection, and is provided with a worm 80 fixed thereon, and meshing with a worm gear 58. A hand wheel 82 is fixed on the upwardly extending end of the shaft 78 for adjusting the worm and worm wheel, and the depending portion of the shaft 78 is connected by a clutch 84 to a drive shaft 85 leading to an electric motor (not shown) mounted beneath the base of the machine.

The bracket 72 is secured to the plate 68 at the upper end by means of a screw 86 (Fig. 3) threaded into the back side of the bracket. The screw is provided with a threadless body 88 received in an arcuate slot 90. The head 92 of the screw is counter-sunk in a slightly enlarged slot 94 communicating with the slot 90, and of similar shape. The bracket 72 thus can be rocked from side to side to engage or disengage the worm 80 and worm wheel 58, to permit rapid approximate indexing of the fixture 54 by means of the knob or hand wheel 64.

The bracket 72 is locked in position with the worm meshing with the gear by means of a plunger 96 having a retracting head 98 thereon, and having a locking tip 100 urged by a spring 102 into an aperture 104 in the plate 68. As will be apparent, when it is desired to disengage the worm from the gear, the plunger 96 is retracted by means of the head 98, and the bracket then may be pivoted to the left (as viewed in Fig. 2).

At the opposite end of the slide 30 from the upstanding flange 44, there is provided an upstanding cylindrical portion 106 having a spindle 108 journalled therein in suitable anti-friction bearings 110. The right end of the spindle is provided with a strain gauge holding fixture 112, shortly to be described in greater detail, and the left end is provided with a gear or serrated wheel 114, the serrations of which actuate a micro-switch 115. The left end of the spindle 108 also is provided with a socket 116 for receiving a driver 118.

The fixtures 54 and 112 are similar, and the configuration of the fixture 112 readily may be seen in Fig. 4. The fixture is provided with four equally arcuately spaced lugs 120 having flat inner faces, defining a square receptacle section 122. The fixture also has substantially triangular lugs or projections 124 intermediate the lugs 120.

The torque load cell or strain gauge is identified by the numeral 126, and is shown in perspective in Fig. 6, and in installed position in Figs. 1, 7 and 8. The load cell or strain gauge is of generally known construction, having wires therein with a lead wire or cable 128 extending therefrom. The load cell is provided with square heads 130 at its opposite ends received in the holding fixtures 54 and 112.

The driver 118 referred to in connection with Fig. 8 is also shown in Fig. 17. As shown in the latter figure, the driver includes a central body portion 132, and a shank 134 received in the axial aperture 116 in the spindle 108. The shank and aperture are complementary, and preferably are noncircular, so as to transmit rotational forces. The opposite end of the body 132 is provided with a non-circular recess into which interchangeable driving bits may be inserted. A bit 136 having a flat blade tip 138 for cooperation with a conventional slotted screw is shown. The bit 136 alternatively could have a cross-head tip, or clutch tip, or any other type of internal driving tip. A modification is shown in Fig. 16, for driving cap screws, nuts, and the like having hexagonal or other noncircular heads or outer configurations. More particularly, the driver, designated as 118a, is provided with a central body 132a having a non-circular shank 134a extending therefrom for receipt in the aperture 116. A shaft 136a extends forwardly from the body, and has received thereon a socket 140 having a hexagonal or other aperture 142 designed for cooperation with the outer surfaces of nuts, cap screws, and the like. As will be understood, the socket 140 is designed to be readily interchangeable for different sizes of nuts or screw or bolt heads. Similarly, the driver 118 can be changed when it is desired to drive screws of different sizes.

The frame 24 is provided with an end wall 144 best seen in Fig. 7. The end wall 144 is provided with a central aperture 146 having a guide bushing 148 received therein. The aperture 146 is provided with a square countersunk recess at 150 for receipt of an expendable cold-rolled steel plate 152.

The frame further is provided with sidewalls 154 having horizontal shoulders 156 (Fig. 11) thereon. Horizontal guides 158 are held on the inner faces of the sidewalls 154 and spaced above the shoulders 156 by means of suitable bolts 160.

The yoke 162 (Figs. 7, 10 and 11) is slidably supported within the frame 24, and comprises a closed rectangular figure having end walls 164 and 166, and sidewalls 168 integral therewith. The sidewalls are provided with horizontally extending cleats or slides 170 received between the shoulders 156 and the horizontal guides 158. Accordingly, the yoke is capable of sliding movement longitudinally of the machine.

The end wall 164 is provided with a central aperture 172 aligned with the aperture 146 in the frame end wall 144. A pair of guides 174 is located in horizontally spaced vertical position on opposite sides of the aperture, and on the inner face of the end wall 164. The guides are held in place by means of screws 176 extending through the yoke end wall 164, and threaded into the guides.

A hardened nut 178 is received in the aperture 172 and held against rotation by the guides 174. The nut 178 is shown in detail in Fig. 12, and comprises a body or head having flats 180 thereon engageable with the guides 174. The nut further includes a cylindrical shank 182 having an internally threaded bore 184 for receipt of the threaded shank of a screw 186 (Figs. 7 and 8) inserted through the plate 152 and the bushing 148. As will be apparent, the screw 186 is driven into the nut 178 by the driver 118, and tends to pull the yoke 162 toward the end wall 144.

In case it is desired to test a nut, rather than a screw, a stud member 178a (Fig. 13) is used in place of the nut 178. The stud member is provided with a head having flats 180a thereon received between the guides 174, and with a body 182a receivable in the aperture 172. A threaded shank 186 extends from the body 182a, and is adapted to project through the bushing 148 and through the plate 152 for receipt of a nut to be driven by the nut driver 118a.

The opposite end wall 166 of the yoke is provided with an aperture 188 aligned with the aperture 172, and is designed to accept the tension load cell or strain gauge identified generally by the numeral 190. The tension load cell is of generally standard design, incorporating wires having a cable or lead wires 192 attached thereto, and is provided at one end with an enlarged head 194 which is inserted through the aperture 188, and is held in place by subsequent association with a split bushing 196 which is received in the aperture 188. As will be apparent in Fig. 11, the yoke is provided with a floor 198 reinforcing the side and end walls.

As is shown in Figs. 5 and 7, the tension strain gauge is provided with an extending shank 200 having an enlarged, bifurcated end 202 thereon. This end is provided with a longitudinal slot 204, and aligned apertures 206 are provided on opposite sides of this slot for receipt of a pin as hereinatfer will be set forth.

The frame 24 is provided with a left end wall 208 having an aperture 210 therein providing clearance for the extending enlarged end 202 of the tension strain gauge 190. The wall 208 is provided with a recess or a cavity 212 in the inner face thereof receiving a wedge block 214 having a very shallow taper on its right face. The wedge block 214 is restrained by the recess or cavity 212 from moving laterally, but is free for limited movement axially of the tension strain gauge 190. The wedge block 214 holds a bushing 216 restraining the enlarged end 202 of the load cell or strain gauge 190.

The frame 24 is provided with an intermediate wall 218 spaced somewhat from the end wall 208, and provided with a central aperture 220 accommodating the load cell 190. A wedge block 222 is positioned between the intermediate wall 218 and the wedge block 214 and is provided with a very shallow taper complementary to that of the right face of the wedge block 214. As will be apparent, both wedge blocks are apertured to provide clearance for the tension strain gauge. Adjustment screws 224 extend through the opposite sides of the frame 24 and against the opposite ends of the wedge block 222. As the front screw (the lower one in Fig. 7) is turned in, the wedge block 222 forces the wedge block 214, and hence the bushing 216 to the left. The rear (or upper) screw is simultaneously backed off. This increases the tension on the load cell 190 without any movement of the screw 186. Conversely, the adjustment screws 224 can be turned in the opposite direction to relieve the tension.

With reference to Fig. 9, it will be seen that the lead wires or cables 128 and 192 from the torque load cell and from the tension load cell, respectively, are connected to a Wheatstone bridge 226. The output of the Wheatstone bridge is connected to a recorder 228. The Wheatstone bridge is of substantially conventional construction, and actually comprises two bridges or balancing circuits, one for torque, and one for tension. The two outputs of the Wheatstone bridge arrangement 226 are supplied to the recorder, as aforesaid, and the recorder is of known type, having a paper tape fed therethrough, and having markings applied thereto by moving pens or styli, there being two pens, one to indicate torque, and one to indicate tension. In addition, a mark is applied to the tape by a marking device each time the microswitch 115 is actuated, whereby to correlate the tension and torque readings with the angular position of the screw being tested.

Auxiliary apparatus or devices are provided for calibrating the testing machine. Examples of such devices are shown in Figs. 14 and 15. Referring first to Fig. 14, there will be seen a lever 230 comprising an elongated arm 232 formed of a T-shaped bar, and having a hook 234 at one end thereof. At the other end of the arm 232, there are provided lateral supports 236 having knife edges 238. The lever is completed by an upstanding hook 240, and the lever provides a ratio of 50 to 1.

The frame 24 is provided with an extending rest 242 (Figs. 7 and 8) having recesses 244 for receiving the knife edges 238. The hook 240 extends up into the slot 204 of the tension load cell 190, and engages with a pin placed through the apertures 206 therein. A known weight is hung on the hook 234 at the end of the arm 232, and the tensional force thus applied to the load cell 190 readily may be calibrated on the recorder 228. As will be understood, the tension strain gauge could be otherwise tested, as in a commercially avialable tension tester, for example.

With reference to Fig. 15, there will be seen a cylindrical body 246 having a square end extension 248 and a round end extension 248' thereon. A rod 250 extends transversely through the body 246, and is locked in adjusted position by a transverse pin 252. A weight 254 is fixed on the end of the rod by pin 256. The square extension 248 is inserted in the axial aperture 116 in the spindle 108, in place of the driver 118, and the round extension 248' is received in a suitable round insert (not shown) in recess 150. With the length of the arm 250 being known, and the magnitude of the weight 254 being known, the torque as recorded on the recorder 228 readily can be calibrated.

Once the machine has been calibrated, and it is desired to test a threaded fastener, such as the screw 186, the screw is manually placed in position, and partially threaded into the nut 178. The slide 30 is advanced by means of the hand wheel 42 to bring the driver 118 into engagement with the screw, and the gear 58 is turned, conveniently by use of the hand wheel 82, properly to align the driver with the slot in the screw head. When the driver is engaged in the screw slot, slide 30 is advanced by hand wheel 42 until the screw rests firmly against expendable plate 152, the screw being turned in by means of the hand wheel 82 or preferably by means of the motor. Slide 30 is then locked in position by means of handle 32 and gib 34.

The machine readily can be utilized to ascertain the various limits of a screw (or a nut), and also can be used in connection with lock washers and the like to ascertain the holding power thereof.

The specific example of the invention as herein shown and described is set forth by way of illustration only. Various changes in structure will no doubt occur to those skilled in the art, and are to be understood as forming a part of the invention insofar as they fall within the spirit and scope of the appended claims.

The invention is claimed as follows:

1. A machine for correlating the relationship of torque and tension for screw threaded fastener elements, comprising, in combination, first and second means respectively including means for supporting two threaded elements on said first and second means respectively and in mutual threaded engagement along a common axis, one of said first and second means including means for rotating one of the threaded elements relative to the other threaded element, means for quantitatively measuring the torque reaction on one of said first and second means incident to operation of said rotating means to rotate relative to each other the mutually engaged threaded elements supported by said first and second means, one of said first and second means including means for quantitatively measuring the force transmitted along said common axis between said first and second means by mutually engaged threaded elements supported thereby, and one of said first and second means including means for adjustment to vary the force transmitted between said first and second means through the mutually engaged threaded elements independently of rotation of the threaded elements relative to each other.

2. A machine for correlating the relationship of torque and tension for screw threaded fastener elements comprising, in combination, first and second means respectively including means for supporting two threaded elements on said first and second means respectively and in mutual threaded engagement along a common axis, one of said first and second means including means for rotating a threaded element supported by one of said first and second means relative to a threaded element supported by the other of said first and second means, said rotating means including electrical strain gauge means for electrically sensing the amount of torque required to rotate the threaded elements relative to each other, one of said first and second means including electrical strain gauge means for quantitatively measuring the force transmitted along said common axis between said first and second means by the threaded elements during rotation of the latter relative to each other; one of said first and second means including adjusting means therefor for adjusting, independently of rotation of the threaded elements relative to each other, the force transmitted between said first and second means through the mutually engaged threaded elements; recording means connected with both said strain gauges to record the torque required to rotate said threaded elements relative to each other and the force transmitted between said threaded elements along said axis.

3. Means for testing the holding power of threaded fasteners, comprising, in combination, two holding elements adapted to support respectively two threaded elements having a common axis when mutually threaded together, means for rotating one of the threaded elements relative to the other, said holding elements being engageable respectively with the two mutually engaged threaded elements supported thereby to restrain movement of said threaded elements relative to each other along said axis upon rotation of said threaded elements relative to each other, means for quantitatively determining the torque required to rotate the threaded elements relative to each other by said rotating means, means for anchoring said holding elements against movement relative to each other along said axis by force transmitted therebetween by the threaded elements, said anchoring means including means for quantitatively determining the anchoring force which restrains movement of said holding elements relative to each other along said axis, and said anchoring means including means for adjusting, independently of rotation of said threaded elements relative to each other, the restraining force anchoring said holding elements against relative movement along said axis.

4. Means for testing the holding power of threaded fasteners comprising, in combination, two holding elements adapted to support respectively two threaded elements having a common axis when mutually threaded together, means for rotating one of the threaded elements relative to the other, said holding elements being engageable respectively with the two threaded elements to restrain movement of said threaded elements relative to each other along said axis upon rotation of said threaded elements relative to each other, means for quantitatively determining the torque required to rotate the threaded elements relative to each other by said rotating means, means for anchoring said holding elements against movement relative to each other along said axis, and said anchoring means including an adjustable anchor and including a strain gauge connected in tension between one of said holding elements and the adjustable anchor to receive the reaction of force transmitted to said one holding element along said axis by the threaded elements, adjustment of said adjustable anchor serving to vary the force transmitted between the threaded elements along said axis independently of rotation of the threaded elements relative to each other.

5. A machine for testing force in rotary threaded fasteners comprising threaded anchor means adapted for threaded engagement with a rotary threaded fastener to be tested, drivng means for rotatably driving a threaded fastener into threaded engagement wtih said anchor means, thrust receiving means engageable with a fastener driven into threaded engagement with said anchor means to receive the force of tension in the fastener, said anchor means tending to move forward said thrust receiving means during said driving, force measuring means connected to said anchor means and resisting said movement, and means securing said force measuring means against movement with respect to said anchor means, said securing means comprising tapered wedge blocks and means for adjusting the same whereby to vary the tension applied to said measuring means independently of rotation of said fastener.

6. A machine as set forth in claim 5 and further including means coacting with said driving means for measuring the torque applied to said fastener by said driving means.

7. A machine for measuring tension and torque in rotary threaded fasteners comprising a base, thrust receiving means fixed relative to said base for receiving thrust from a fastener being driven, threaded anchor means adjacent said thrust receiving means and free for limited movement relative to said base, tension measuring means restraining movement of said anchor means for measuring the tension applied thereto as a fastener is driven, means securing said tension measuring means against movement relative to said base, said securing means being adapted to vary the tension measuring means independently of said fastener, a slide mounted on said base for movement toward and away from said thrust receiving means and said anchor means, driving means mounted on said slide and adapted for engagement wtih a rotary threaded fastener to drive said fastener into threaded association with said anchor means, torque measuring means connected to said driving means, and rotary force applying means connected to said torque measuring means for rotating said driving means through said torque measuring means, whereby to measure the torque applied to a fastener driven by said driving means.

References Cited in the file of this patent
UNITED STATES PATENTS

| | | |
|---|---|---|
| 2,030,464 | Nilson | Feb. 11, 1936 |
| 2,441,608 | Warner | May 18, 1948 |
| 2,586,708 | Petit | Feb. 19, 1952 |
| 2,703,976 | Livermont | Mar 15, 1955 |
| 2,706,903 | Livermont | Apr. 26, 1955 |
| 2,720,111 | Clark | Oct. 11, 1955 |
| 2,795,131 | Booth | June 11, 1957 |

UNITED STATES PATENT OFFICE
CERTIFICATE OF CORRECTION

Patent No. 2,957,342                           October 25, 1960

Walter M. Hanneman

It is hereby certified that error appears in the printed specification of the above numbered patent requiring correction and that the said Letters Patent should read as corrected below.

Column 7, line 23, for "drivng" read -- driving --; line 24, for "wtih" read -- with --; line 28, for "forward" read -- toward --; column 8, line 19, for "wtih" read -- with --.

Signed and sealed this 25th day of April 1961.

(SEAL)
Attest:

ERNEST W. SWIDER                                  DAVID L. LADD
Attesting Officer                                     Commissioner of Patents